Patented Aug. 28, 1934

1,971,662

UNITED STATES PATENT OFFICE 1,971,662

ETHER OF POLYVINYL ALCOHOL

Albrecht Schmidt, Gerhard Balle, and Kurt Eisfeld, Frankfort-on-the-Main, Germany, assignors to I. G. Farbenindustrie Aktiengesellschaft, Frankfort-on-the-Main, Germany No Drawing. Application December 16, 1930, Serial No. 502,845. In Germany December 27, 1929

5 Claims. (Cl. 260—2)

The present invention relates to ethers of polyvinyl alcohols.

We have found that by causing compounds containing the following group:

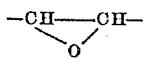

for instance such as correspond to the following formula:

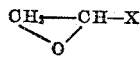

wherein X stands for hydrogen, alkyl, hydroxy alkyl or halogen alkyl, as ethylene oxide, propylene oxide, 1.2-butylene oxide, epichlorohydrin, glycide or the like, furthermore 2.3-butylene oxide, to react upon polyvinyl alcohols, there are obtained new valuable alkoxylation products which according to the number of hydroxy-alkyl residues which have entered the molecule possess different properties. The poylvinyl alcohols may thus be alkoxylated totally or partially. The products obtained at the alkoxylation contain at least one group of the following formula:

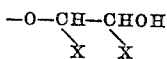

wherein X stands for hydrogen, alkyl, hydroxy alkyl or halogen alkyl. The reaction between alkylene oxides and polyvinyl alcohols may take place without the addition of an auxiliary agent at ordinary temperature or at a temperature raised to about 150° C. The new products may be obtained by causing the alkylene oxide to act upon the polyvinyl alcohol under atmospheric pressure. The reaction may likewise be carried out in a closed vessel under a subatmospheric pressure or under a superatmospheric pressure corresponding to or higher than the tension of the alkylene oxide used. An inert gas may be present in the closed vessel during the reaction. There may be used agents accelerating the course of the reaction, for instance tertiary organic bases, such as dimethyl aniline, trimethyl amine, pyridine, alkalies, such as NaOH, KOH, alkaline earth hydroxides; furthermore salts having a basic reaction, such as sodium acetate, sodium oxalate, trisodium phosphate. If these accelerators are used, there are generally obtained products which contain more hydroxy alkyl groups than the polyvinyl alcohols subjected without a condensing agent to the action of alkylene oxides.

In their outward appearance the reaction products are similar to the starting material or there are obtained more or less plastic products. The polyvinyl alcohols containing several hydroxy alkyl groups may be used as plastic masses after having been rendered homogeneous by pressing or rolling them. The ethers prepared by means of alkylene oxides of a low molecular weight are generally soluble in water; if alkylene oxides of a higher molecular weight or if a polyvinyl alcohol still containing ester groups are used, the products obtained are sparingly soluble or insoluble in water.

The products are suitable for various industrial purposes, for instance for preparing plastic masses; the water-soluble ethers may also be used for preparing thickening agents and dressing agents. We have also found, that an excellently well sized textile material is obtained by treating the fibers with the above-mentioned water-soluble ethers of polyvinyl alcohols especially with the products obtained by the reaction between alkylene oxides and polyvinyl alcohols of a high viscosity. The sizing solutions prepared by means of these reaction products impart to artificial and natural threads of all kinds an excellent sizing effect while maintaining or increasing the softness and suppleness.

These new sizing agents possess the further advantage that a special process of freeing the threads from size can be dispensed with because the agents can be easily eliminated from the threads by washing them with water.

The following examples serve to illustrate the invention, but they are not intended to limit it thereto, the parts being by weight:

(1) 100 parts of polyvinyl alcohol are mixed with 100–200 parts of ethylene oxide and the mixture is heated in a pressure vessel for several hours to 50° C.–100° C. When the excess of ethylene oxide has been distilled, there are left 110–150 parts of a hydroxy ethylated polyvinyl alcohol which, with regard to its outward appearance is hardly altered when compared with the starting material. The reaction may be carried out at ordinary or raised or reduced pressure, if required, in the presence of an inert gas.

(2) 100 parts of polyvinyl alcohol are mixed with 100–150 parts of propylene oxide and 5–10 parts of dimethyl aniline and the mixture is heated for several hours in a pressure vessel to 50° C.–70° C. When the excess of propylene oxide has been distilled and the dimethyl aniline has been eliminated by means of a steam distillation, about 160 parts of a hydroxy propylated polyvinyl alcohol are obtained. The product is soluble in water and has a swollen form when compared with the starting material.

(3) 100 parts of a partially saponified polyvinyl ester are mixed with 200 parts of ethylene oxide and 3 parts of a caustic soda solution of 50 per cent. strength and the mixture is heated for several hours in a pressure vessel to 40° C.–50° C. There are produced swollen plastic masses from which the alkali may be removed for instance by washing them with dilute alcohol.

The reaction may likewise be carried out by treating polyvinyl alcohol either alone or in the presence of a tertiary organic base or in the presence of alkali with alkylene oxides in the vapor phase, at ordinary or raised pressure or in a vacuum, if required in the presence of an inert gas.

(4) The reaction product of propylene oxide and polyvinyl alcohol is diluted with water so as to form a solution of 10–15 per cent. strength. Natural threads or artificial threads in skein or on the warp sizing machine are sized by means of this solution.

(5) A hydroxy ethylated polyvinyl alcohol prepared by causing ethylene oxide to react upon polyvinyl alcohol is diluted with water so as to form a solution of 1–2 per cent. strength, artificial silk in skein is treated for a short time with this solution, centrifuged, dried and loosened. In an analogous manner the solution may be applied on the warp sizing machine.

This solution is sufficient for thin threads of artificial silk or for natural threads capable of being easily sized. For a coarser titer or for acetate silk, a solution of 10 per cent. strength or more is required.

The threads show a particularly good sizing effect. The material can be dyed without being previously freed from the size or pre-treated in any other manner.

We claim:

1. As new products, ethers of polyvinyl alcohols, said ethers containing at least one group of the following formula:

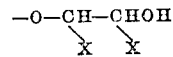

wherein X stands for hydrogen, alkyl, hydroxy alkyl or halogen alkyl

2. As new products, beta-hydroxy alkyl ethers of polyvinyl alcohols.

3. As new products, beta-hydroxy alkyl ethers of polyvinyl alcohols, said ethers containing free hydroxy groups in the polyvinyl residue.

4. As new products, beta-hydroxy ethyl ethers of polyvinyl alcohols.

5. As new products, beta-hydroxy ethyl ethers of polyvinyl alcohols, said ethers containing free hydroxy groups in the polyvinyl alcohol residue.

ALBRECHT SCHMIDT.
GERHARD BALLE.
KURT EISFELD.